United States Patent
Lowry et al.

(10) Patent No.: US 7,940,732 B2
(45) Date of Patent: May 10, 2011

(54) AUTOMATIC WIRELESS NETWORK DEVICE CONFIGURATION

(75) Inventors: Sadie Lowry, Atlanta, GA (US); Kelli Cates Beck, Peachtree City, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1145 days.

(21) Appl. No.: 11/624,934

(22) Filed: Jan. 19, 2007

(65) Prior Publication Data

US 2008/0175187 A1     Jul. 24, 2008

(51) Int. Cl.
*H04W 4/00*  (2009.01)
*H04M 1/00*  (2006.01)

(52) U.S. Cl. .............. 370/338; 455/435.1; 455/556.1

(58) Field of Classification Search .......... 370/328, 370/338, 901, 902, 908, 912, 913, 915; 455/412.1, 455/414.2, 418, 419, 420, 421, 435.1, 446, 455/556.1, 556.2, 557
See application file for complete search history.

(56) References Cited

U.S. PATENT DOCUMENTS

| | | | |
|---|---|---|---|
| 6,978,023 B2 * | 12/2005 | Dacosta | 380/258 |
| 7,441,043 B1 * | 10/2008 | Henry et al. | 709/238 |
| 2003/0212768 A1 * | 11/2003 | Sullivan | 709/220 |
| 2005/0099977 A1 * | 5/2005 | Williams et al. | 370/338 |
| 2005/0114315 A1 * | 5/2005 | Tanner et al. | 707/3 |
| 2005/0266826 A1 * | 12/2005 | Vlad | 455/410 |
| 2006/0221915 A1 * | 10/2006 | Gatta et al. | 370/338 |
| 2007/0050615 A1 * | 3/2007 | Xu et al. | 713/151 |
| 2008/0032677 A1 * | 2/2008 | Catovic et al. | 455/414.1 |
| 2008/0062937 A1 * | 3/2008 | Mansfield et al. | 370/338 |
| 2008/0112376 A1 * | 5/2008 | Liu | 370/338 |
| 2008/0155402 A1 * | 6/2008 | Jean et al. | 715/700 |

* cited by examiner

*Primary Examiner* — George Eng
*Assistant Examiner* — Christopher M Brandt
(74) *Attorney, Agent, or Firm* — Moazzam & Associates, LLC

(57) ABSTRACT

A portable wireless configuration device, such as a key fob, is provided which executes an application program to configure a wireless client device to connect to a secured wireless network via an access point. The wireless client device may be unconnected to and remote from the access point. A request signal is transmitted from the wireless configuration device to the access point in response to detecting a user input on the wireless configuration device. The request signal includes a request for network connectivity settings associated with the secured wireless network. The wireless configuration device receives and then stores the network connectivity settings from the access point. The wireless configuration device then transmits the settings to the wireless client device to be configured.

15 Claims, 3 Drawing Sheets

AUTOMATIC WIRELESS NETWORK DEVICE CONFIGURATION

BACKGROUND

Wireless ("Wi-Fi") networks, which use high-frequency radio waves instead of wires to connect to computer networks such as the Internet, are increasingly gaining in popularity to support a growing number of Wi-Fi capable devices including printers, kitchen appliances, televisions, stereo equipment, video game consoles, and the like. Typically, a Wi-Fi network includes a wireless access point ("WAP") which has a wireless radio for communicating with one or more client computing devices equipped with a wireless adapter.

Since Wi-Fi networks utilize radio waves for communication, client computing devices must be configured according to various wireless settings in order to communicate with a WAP. These settings include an identification (i.e., SSID) associated with the WAP and a password or key associated with wireless encryption settings required for secure communications with a wireless client computing device. Typically, the required configuration settings are manually entered utilizing software on each client computing device desired to be connected to a wireless network.

Manual wireless configuration methods however, suffer from a number of drawbacks. One drawback is that configuration settings must be entered each time a new device is added to a wireless network requiring a user to have an understanding of and access to the required settings. Thus, users who do not understand the various configuration settings and/or had a network installer or other third-party configure their wireless network, may not have access to the required configuration settings upon connecting a new client computing device to an existing network. Another drawback is that even if a user does have access to the configuration settings, these settings are often written down and thus subject to being misplaced or lost by the user. As a result, a user desiring to add a new client computing device must either retrieve the settings from the WAP using an already connected client device or reset the WAP to an unsecured default state in order to connect additional client computing devices to the wireless network. It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Various embodiments utilizing the techniques described herein solve the above and other problems by providing a portable wireless configuration device, such as a key fob, which executes an application program to configure a wireless client device to connect to a secured wireless network via an access point. The wireless client device may be unconnected to and remote (i.e., outside of a wireless range) with respect to the access point. A request signal is transmitted from the wireless configuration device to the access point in response to detecting one or more user inputs on the wireless configuration device. The request signal includes a request for network connectivity settings associated with the secured wireless network. The wireless configuration device receives and then stores the network connectivity settings from the access point. The wireless configuration device then transmits the settings to the wireless client device to be configured in response to detecting the one or more user inputs on the wireless configuration device.

Other systems, methods, and/or computer program products according to various embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
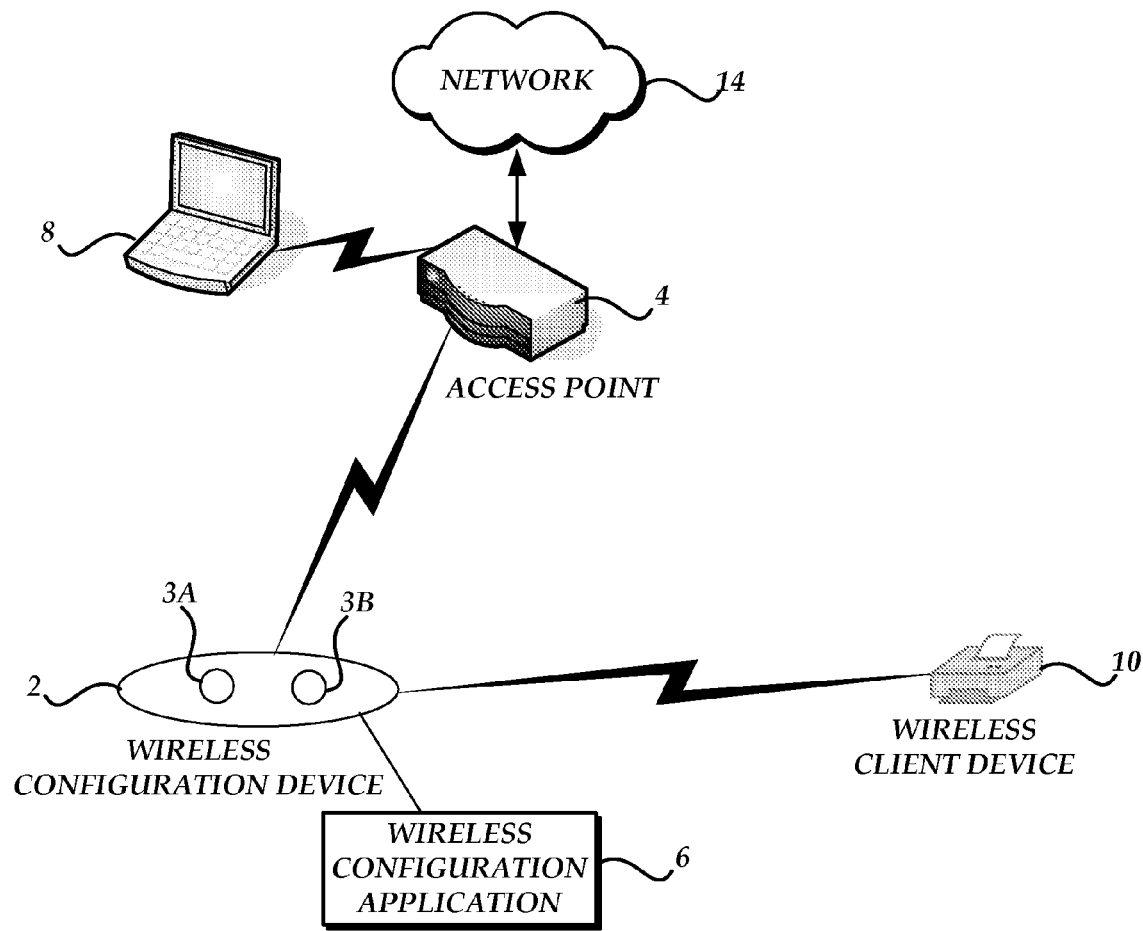
FIG. 1 is a wireless network diagram illustrating aspects of network devices utilized in and provided by various embodiments of the invention.

As briefly described above, embodiments of the present invention are directed to providing a wireless configuration device which executes an application program to configure a wireless client device to connect to a secured wireless network via an access point. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Referring now to the drawings, in which like numerals represent like elements through the several figures, various aspects of the present invention and an illustrative wireless network environment will be described. In particular, FIG. 1 and the corresponding discussion are intended to provide a brief, general description of a suitable wireless network in which the invention may be implemented. While the invention will be described in the general context of program modules that execute in conjunction with an application program that runs on computing device, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process, a computing device, or as an article of manufacture, such as a computer program product or computer-readable media. The computer program product may be a computer storage media readable by a computer system and encoding a computer program of instructions for executing a computer process. The computer program may also be a propagated signal on a carrier readable by a computing system and encoding a computer program of instructions for executing a computer process.

Referring now to FIG. 1, an illustrative wireless network environment for the several embodiments, utilizing the techniques described herein, will be described. As shown in FIG. 1, a portable wireless configuration device 2 is in communication with an access point 6 and a wireless client device 10. According the exemplary embodiments, the wireless configuration device 2 is operative to execute a wireless configuration application 4 and includes push button switches 3A and 3B for performing various computer-implemented instructions contained in the wireless configuration application 4 which are associated with configuring the wireless client device 10 so that it may wirelessly connect to the access point 6. According to the various embodiments utilizing the technical features described herein, the wireless configuration device 2 may be incorporated into a key fob, a card (such as a credit card or smart card), a telephone handset, and the like. The wireless configuration device 2 and the wireless configuration application 4 will be described in greater detail below with respect to FIGS. 2-3.

The access point 6 may include a wireless router or gateway and, in addition to the wireless configuration device 2, is also in communication with a computer 8 and network 14. It should be appreciated that the network 14 may comprise any type of computing network, including a local area network or a wide area network, such as the Internet. The access point 6 may provide wireless access for the computer 8 and other configured client devices to the network 14. The computer 8 may comprise a general purpose desktop computer, laptop computer, or other computing device (including, but not limited to, cellular telephones, Personal Digital Assistants, and the like) capable of executing one or more application programs. According to various embodiments, among others, utilizing the technical features described herein, the access point 6 may be configured with a number of network connectivity settings, which are known to those skilled in the art, for enabling similarly configured client computing devices (such as the wireless client device 10) to connect to a wireless local area network ("WLAN"). These network connectivity settings may include, but are not limited to, a service set identifier ("SSID"), wireless network security settings, a dynamic host configuration protocol ("DHCP") setting, a static Internet Protocol ("IP") address, a domain name server address ("DNS") setting, and a media access control ("MAC") address. The wireless network security settings provide secured (e.g., encrypted) access to the WLAN for connected client computing devices utilizing a number of wireless security protocols known to those skilled in the art. These protocols may include, but are not limited to, Wired Equivalent Privacy ("WEP") and Wi-Fi Protected Access ("WPA"). As known to those skilled in the art, these wireless security protocols utilize a "key" or passphrase to encrypt data communications between wireless devices in a WLAN. The access point 6 may communicate with connected client computing devices utilizing the 802.11 family of specifications for wireless local area networks developed by the Institute of Electrical and Electronics Engineers ("IEEE"), said specifications being incorporated herein by reference.

Those skilled in the art should appreciate and understand that the access point 6 and client computing devices (e.g., the wireless configuration device 2, the computer 8, and the wireless client device 10) may also be configured to communicate utilizing other wireless communication technologies including, but not limited to, BLUETOOTH wireless technology, Infrared, Digital Enhanced Cordless Telecommunications ("DECT"), CDMA and TDMA technologies (utilized by GSM and CDMA digital cellular systems), and IEEE 802.16 ("WiMAX"), in accordance with alternative embodiments utilizing the techniques described herein. Those skilled in the art should further appreciate and understand that, in accordance with an alternative embodiment, the access point 6, the wireless configuration device 2, the computer 8, and the wireless client device 10 may be also be configured to communicate using wired technologies including, but not limited to, the Universal Serial Bus ("USB") standard.

The wireless client device 10 may comprise any computing device capable of wireless communication with the access point 6 through the use of an internal or externally attached wireless adapter. Although shown as a wireless printer, it should be appreciated that the wireless client device 10 may include any number of computing devices capable of wireless communication with an access point including, but not limited to, kitchen appliances, televisions, stereo equipment, video game consoles, telephony devices, portable media players, and the like. The wireless client device 10 may include a utility for configuring the set of network connectivity settings (discussed above) for connecting to a WLAN through the access point 6.

Figure 2:
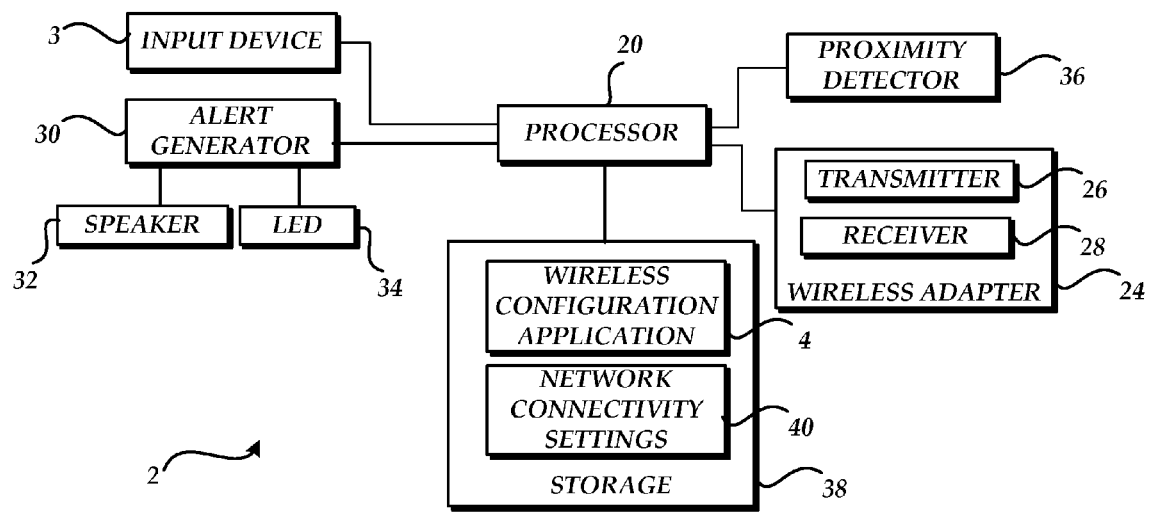
FIG. 2 is an architecture diagram illustrating aspects of a wireless configuration device utilized in and provided by various embodiments of the invention.

Referring now to FIG. 2, an architecture diagram illustrating aspects of the wireless configuration device 2 utilized in various embodiments of the invention, among others, will be described. The wireless configuration device 2 includes an input device 3, a processor 20 (i.e., a central processing unit), a wireless adapter 24, an alert generator 30, a proximity detector 36, a microphone 37, and a storage 38.

The processor 20 is connected to the storage 38 which stores the wireless configuration application 4 and network connectivity settings 40. The processor 20 is operative to execute instructions contained in the wireless configuration application 4 to enable the wireless configuration device 2 to request the network connectivity settings 40 from the access point 6 and transmit them to the wireless client device 10, thus enabling the wireless client device 10 to connect to the access point 6. As discussed above in FIG. 1, network connectivity settings may include, but are not limited to, SSID information, wireless network security settings, DHCP settings, a static IP address, DNS settings, and MAC address information. An illustrative process describing the request, storage, and transfer of the wireless configuration settings 40 between the access point 6, the wireless configuration device 2, and the wireless client device 10 will be discussed below with respect to FIG. 3.

The storage 38 may store the network connectivity settings 40 as encrypted data and may include a volatile or non-volatile and removable or non-removable medium implemented in any method or technology for the storage of information such as computer-readable instructions, data structures, program modules or other data. The storage medium may include, but is not limited to, RAM, ROM, EPROM, EEPROM, flash memory or other solid state memory technology, or any other medium which can be used to store desired information and which can be accessed by the wireless configuration device 2.

The input device 3 is connected to the processor 20 and may comprise the push button switches 3A and 3B briefly discussed above with respect to FIG. 1. In accordance with the various embodiments utilizing the technical features described therein, the push button switch 3A may be employed by a user to generate the transmission of a request signal to request the network connectivity settings 40 from the access point 6, and the push button switch 3B may be employed by the user to initiate the transmission of the network connectivity settings 40 to the wireless client device 10. It should be understood that in accordance with an alternative embodiment, the input device 3 may comprise a single push button switch which is operable to transmit the request signal for the network connectivity settings in response to a single button press and operable to transmit the network connectivity settings to the wireless client device 10 (and possibly additional wireless client devices) in response to two button presses by a user for each client device. It will be appreciated that in accordance with still another alternative embodiment, the input device 3 may comprise a microphone operable to receive voice commands from a user which are utilized by the wireless configuration application 4 to transmit the request signal for the network connectivity settings 40 from the wireless configuration device 2 to the access point 6 and to transmit the network connectivity settings 40 from the wireless configuration device 2 to the wireless client device 10, as will be described in greater detail below with respect to FIG. 3.

The wireless adapter 24 is connected to the processor 20 and includes a transmitter 26 and a receiver 28. It should be understood by those skilled in the art that the wireless adapter 24 functions as an interface to enable the wireless configuration device 2 to wirelessly communicate signals with the access point 6 and the wireless client device 10. The wireless adapter 24 may be configured for wireless communication using one or more of the IEEE 802.11 wireless communications standards.

The alert generator 30 is connected the processor 20, a speaker 32 and a light emitting diode ("LED") 34. In accordance with the various embodiments utilizing the technical features described herein, the alert generator may be operable to generate audio and/or visual confirmation alert signals in response to receiving network connectivity settings from the access point 6 and in response to transmitting the network connectivity settings to the wireless client device 10. In particular, the alert generator 30, in response to instructions contained in the wireless configuration application 4, may generate an audible alert through the speaker 32 or activate the LED 34 when the network connectivity settings 40 are received from the access point 6 and after transmitting the network connectivity settings 40 to the wireless client device 10.

The proximity detector 36 is connected to the processor 20 and, in accordance with the various embodiments utilizing the technical features described herein, may be operable to determine whether the wireless configuration device 2 is outside of a predetermined distance (i.e., outside of 12 inches) of either the access point 6 or the wireless client device 10, prior to transmitting the request signal for the network connectivity settings 40 to the access point 6 and prior to transmitting the network connectivity settings 40 to the wireless client device 10. It will be understood by those skilled in the art that the proximity detector 36 may utilize any of a number of known technologies for proximity detection. For instance, according to various embodiments, among others, the proximity detector 36 may comprise a non-contact type proximity detector utilizing reflected photoelectric (e.g., infrared) or ultrasonic signals which detects objects in a close proximity to the wireless configuration device 2.

Figure 3:
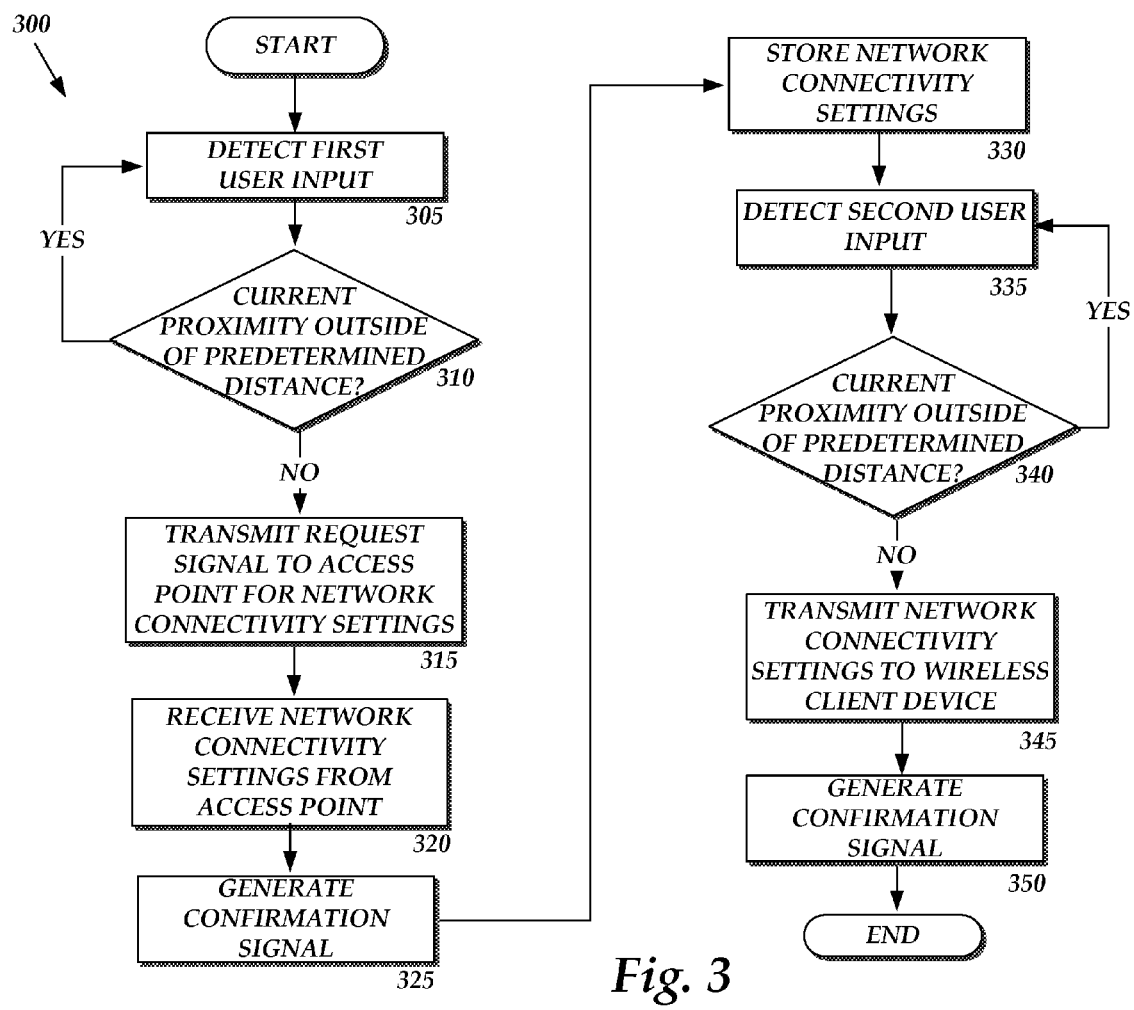
FIG. 3 is a flow diagram illustrating aspects of a process for utilizing a wireless configuration device to configure a wireless client device for connection to a secured wireless network, in accordance with various embodiments of the invention.

Referring now to FIG. 3, an illustrative routine 300 will be described illustrating a process performed by the wireless configuration application 4 for configuring the wireless client device 10 to connect to the access point 6 in the wireless network of FIG. 1. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 3 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 305, where the wireless configuration application 4 detects a first user input on the wireless configuration device 2. In particular, the wireless configuration application 4 may detect if a user has pressed one of the push button switches 3A or 3B for requesting network connectivity settings from the access point 6. It should be understood that according to various embodiments, among others, utilizing the technical features described herein, that the access point 6, the wireless configuration device 2, and the wireless client device 10 may be "push button capable" devices compatible with the Push Button Configuration ("PBC") method disclosed in the proposed Wi-Fi Simple Config Specification (Version 1.0) provided by the Wi-Fi Simple Config working group in the Wi-Fi Alliance which is incorporated herein, in its entirety, by reference. In particular, the PBC method allows a "Registrar" device to provide credentials to PBC-capable "Enrollee" devices via a single button press and which allows the Enrollee devices to access a WLAN. For instance, in accordance with various embodiments, the access point 6 could be configured with a push button switch (not shown) which may be pressed nearly simultaneously (e.g., just prior to or just after) by a user upon the user pressing one of the push button switches 3A or 3B on the wireless configuration device 2 for requesting network connectivity settings. It should be understood by those skilled in the art that the access point 6 may also be configured to automatically engage the push button upon receiving and recognizing the request signal from the wireless configuration device 2. It will be appreciated that according to other embodiments, the wireless configuration application 4 may include a receive voice recognition module or execute in conjunction with a voice recognition software application (not shown) stored in the storage 38 for receiving user inputs as commands for performing the same or similar functions as the push button switches 3A or 3B on the wireless configuration device 2. In particular, the wireless configuration application 4 may be configured to detect a voice command such as "Request Network Connectivity Settings" and, in response, instruct the wireless configuration device 2 to transmit a request signal to the access point 6.

From operation 305, the routine 300 continues to operation 310, where the wireless configuration application 4 determines whether a current proximity to the access point 6, with respect to the configuration device 2, is outside of a predetermined distance. In particular, the wireless configuration application 4 may receive current proximity data from the proximity detector 36 and if the current proximity is outside of a predetermined distance, the wireless configuration application 4 will not instruct the transmitter 26 in the wireless adapter 24 to transmit a request signal to the wireless access point 6 for network connectivity settings. The wireless configuration application 4 may instruct the alert generator 30 to generate an audible signal through the speaker 32 or a visual signal utilizing the LED 34 to notify a user that the network connectivity settings were not requested. It will be appreciated that inhibiting the transmission of the request signal when the access point 6 is outside of a predetermined distance from the wireless configuration device 2 helps to insure that the request signal is not intercepted by an undesired wireless device in a WLAN. From operation 310, the routine 300 then returns to operation 305 where the wireless configuration application 4 detects subsequent user inputs on the wireless configuration device 2.

If, at operation 310, the wireless configuration application 4 determines that the current proximity is not outside of the predetermined distance, then the routine 300 continues to operation 315 where the wireless configuration application 4 instructs the transmitter to transmit a request signal to the access point 6 for retrieving network connectivity settings associated with connecting with wireless devices.

From operation 315, the routine 300 continues to operation 320, where the wireless configuration application 4 receives the network connectivity settings from the access point 6. As discussed above, the network connectivity settings may include SSID information, wireless network security settings, DHCP settings, a static IP address, DNS settings, and MAC address information.

From operation 320, the routine 300 continues to operation 325, where the wireless configuration application 4 generates a confirmation signal upon receiving the network connectivity settings from the access point 6. In particular, the wireless configuration application 4 may instruct the alert generator 30 to generate an audible signal through the speaker 30 or a visual signal utilizing the LED 34 to notify a user that the network connectivity settings have been successfully retrieved from the access point 6.

From operation 325, the routine 300 continues to operation 330, where the wireless configuration application 4 stores the network connectivity settings in the storage 38. In particular, the network connectivity settings may be stored as encrypted data in the storage 38 until the wireless configuration device 2 is reset or updated (i.e., by repeating operations 305-330).

From operation 330, the routine 300 continues to operation 335, where the wireless configuration application 4 detects a second user input on the wireless configuration device 2. In particular, the wireless configuration application 4 may detect if a user has pressed one of the push button switches 3A or 3B for transmitting the received network connectivity settings to the wireless client device 10. For instance, in accordance with various embodiments, the wireless client device 10 may be a PBC-capable device (as discussed above with respect to operation 305) and configured with a push button switch (not shown) which may be pressed nearly simultaneously (e.g., just prior to or just after) by a user upon the user pressing one of the push button switches 3A or 3B on the wireless configuration device 2 for transmitting the received network connectivity settings. It should be understood by those skilled in the art that the wireless client device 10 may also be configured to automatically engage the push button upon receiving and recognizing a signal transmitted from the wireless configuration device 2. It should be understood that once the network connectivity settings are transmitted to the wireless client device 10, they remain stored in the storage 38 (i.e., they are not erased). Thus, in accordance with various embodiments, among others, the wireless configuration device 2 may be utilized to transmit the received network connectivity settings to multiple client devices (which are in proximity to the wireless configuration device 2) simultaneously or at different times (e.g., by repeatedly pressing the push button switch 3B) without having to repeatedly request the network connectivity settings from the access point 6. It will be appreciated that according to other embodiments, the wireless configuration application 4 may utilize voice recognition, as discussed above with respect to operation 305, to detect a voice commands such as "Transmit Network Connectivity Settings" and, in response, instruct the wireless configuration device 2 to transmit the network connectivity settings from the storage 38 to the wireless client device 10 (and/or other wireless devices desired to be configured).

From operation 335, the routine 300 continues to operation 340, where the wireless configuration application 4 determines whether a current proximity to the wireless client device 10, with respect to the configuration device 2, is outside of a predetermined distance. In particular, the wireless configuration application 4 may receive current proximity data from the proximity detector 36 and if the current proximity is outside of a predetermined distance, then the wireless configuration application 4 will not instruct the transmitter 26 in the wireless adapter 24 to transmit the received network connectivity settings to the wireless client device 10. The wireless configuration application 4 may instruct the alert generator 30 to generate an audible signal through the speaker 32 or a visual signal utilizing the LED 34 to notify a user that the network connectivity settings were not transmitted. It will be appreciated that by inhibiting the transmission of the connectivity settings when the wireless client device 10 is outside of a predetermined distance from the wireless configuration device 2 helps to insure that the request signal is not intercepted by an undesired wireless device in a WLAN. From operation 340, the routine 300 then returns to operation 335 where the wireless configuration application 4 detects subsequent user inputs on the wireless configuration device 2.

If, at operation 340, the wireless configuration application 4 determines that the current proximity is not outside of the predetermined distance, then the routine 300 continues to operation 345 where the wireless configuration application 4 instructs the transmitter to transmit the network connectivity settings to the wireless client device 10. It should be understood that transmitting the network connectivity settings to the wireless client device 10 configures the wireless client device with the settings necessary to establish a connection with the wireless access point 6. In particular, those skilled in the art should understand that the wireless client device 10 may be configured to utilize the received network connectivity settings to modify settings associated with an internal or external wireless adapter and enable communication with the access point 6 and/or other similarly configured wireless devices.

From operation 345, the routine 300 continues to operation 350, where the wireless configuration application 4 generates a confirmation signal upon transmitting the network connectivity settings to the wireless client device 10. In particular, the wireless configuration application 4 may instruct the alert generator 30 to generate an audible signal through the speaker 30 or a visual signal utilizing the LED 34 to notify a user that the network connectivity settings have been successfully transmitted to the wireless client device 10.

Based on the foregoing, it should be appreciated that various embodiments of the present invention, among others, are directed to providing a wireless configuration device which executes an application program to configure a wireless client device to connect to a secured wireless network via an access point. It will be apparent by those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method for configuring a wireless client device to connect to a secured wireless network, comprising:
   detecting at least one user input on a wireless configuration device;
   in response to detecting the at least one user input, transmitting a request signal from the wireless configuration device to an access point for network connectivity settings associated with the secured wireless network;
   receiving the network connectivity settings from the access point on the wireless configuration device;
   generating a first confirmation signal in response to receiving the network connectivity settings from the access point;
   in response to detecting the at least one user input, transmitting the network connectivity settings from the wireless configuration device to the wireless client device, the wireless client device being unconnected to and remote from the access point upon receiving the network connectivity settings; and
   generating a second confirmation signal in response to transmitting the network connectivity settings to the wireless client device;
   wherein generating a first confirmation signal and a second confirmation signal comprises generating at least one of a visual alert and an audible alert.

2. The method of claim 1 further comprising storing the received network connectivity settings on the wireless configuration device.

3. The method of claim 1 further comprising determining a current proximity to the access point, wherein if the proximity is outside of a predetermined distance, then inhibiting the transmission of the request signal and inhibiting the transmission of the network connectivity settings to the wireless client device in response to detecting the at least one user input.

4. The method of claim 1, wherein transmitting the request signal comprises transmitting at least one of a wireline and a wireless signal in a format including at least one of a cellular network signal format, IEEE 802.11, IEEE 802.16, BLUETOOTH, DECT, and USB.

5. The method of claim 1, wherein receiving the network connectivity settings from the access point on the wireless configuration device comprises receiving at least one of a service set identifier, wireless network encryption data, a dynamic host configuration protocol setting, a static Internet Protocol address, a domain name server address setting, and media access control filtering data.

6. An apparatus for configuring a wireless client device to connect to a secured wireless network, comprising:
   a transmitter for transmitting a request signal to an access point for network connectivity settings associated with the secured wireless network in response to detecting at least one user input and for transmitting the network connectivity settings to the wireless client device in response to detecting the at least one user input, the wireless client device being unconnected to and remote from the access point upon receiving the network connectivity settings;
   a receiver for receiving the network connectivity settings from the access point;
   a processor, in communication with the transmitter and the receiver, for executing instructions to format the request signal prior to transmission to the access point, transmit the request signal to the access point, and transmit the network connectivity settings to the wireless client device; and
   an alert generator, in communication with the transmitter and the receiver, for generating an alert in response to receiving the network connectivity settings from the access point and in response to transmitting the network connectivity settings to the wireless client device.

7. The apparatus of claim 6 further comprising:
   a storage for storing the network connectivity settings received by the receiver; and
   a proximity detector, in communication with the processor, for determining a current proximity to the access point, wherein if the proximity is outside of a predetermined distance, the processor executes instructions to inhibit the transmitter from transmitting the request signal and from transmitting the network connectivity settings to the wireless client device in response to the at least one user input.

8. The apparatus of claim 6, wherein the alert generator comprises a light emitting diode for generating a visual alert in response to receiving the network connectivity settings from the access point and in response to transmitting the network connectivity settings to the wireless client device.

9. The apparatus of claim 6, wherein the alert generator comprises a speaker for generating an audible alert in response to receiving the network connectivity settings from the access point and in response to transmitting the network connectivity settings to the wireless client device.

10. The apparatus of claim 6, wherein the request signal comprises at least one of a wireline and a wireless signal in a format including at least one of a cellular network signal format, IEEE 802.11, IEEE 802.16, BLUETOOTH, DECT, and USB.

11. The apparatus of claim 6, wherein the network connectivity settings associated with the secured wireless network comprises at least one of a service set identifier, wireless network encryption data, a dynamic host configuration protocol setting, a static Internet Protocol address, a domain name server address setting, and media access control filtering data.

12. A non-transitory computer-readable medium having executable instructions, which, when executed on a wireless configuration device, will cause the wireless configuration device to perform a method for configuring a wireless client device to connect to a secured wireless network, the method comprising:
   detecting at least one user input on the wireless configuration device;
   in response to detecting the at least one user input, transmitting a request signal from the wireless configuration device to an access point for network connectivity settings associated with the secured wireless network;
   receiving the network connectivity settings from the access point on the wireless configuration device;

generating a first confirmation signal in response to receiving the network connectivity settings from the access point;

storing the received network connectivity settings on the wireless configuration device;

in response to detecting the at least one user input, transmitting the network connectivity settings from the wireless configuration device to the wireless client device, the wireless client device being unconnected to and remote from the access point upon receiving the network connectivity settings; and generating a second confirmation signal in response to transmitting the network connectivity settings to the wireless client device;

wherein generating a first confirmation signal and a second confirmation signal comprises generating at least one of a visual alert and an audible alert.

13. The computer-readable medium of claim 12 further comprising determining a current proximity to the access point, wherein if the proximity is outside of a predetermined distance, then inhibiting the transmission of the request signal and inhibiting the transmission of the network connectivity settings to the wireless client device in response to detecting the at least one user input.

14. The computer-readable medium of claim 13, wherein transmitting the request signal comprises transmitting at least one of a wireline and a wireless signal in a format including at least one of a cellular network signal format, IEEE 802.11, IEEE 802.16, BLUETOOTH, DECT, and USB.

15. The computer-readable medium of claim 13, wherein receiving the network connectivity settings from the access point on the wireless configuration device comprises receiving at least one of a service set identifier, wireless network encryption data, a dynamic host configuration protocol setting, a static Internet Protocol address, a domain name server address setting, and media access control filtering data.

* * * * *